United States Patent [19]

Vogley

[11] Patent Number: 5,572,722
[45] Date of Patent: Nov. 5, 1996

[54] TIME SKEWING ARRANGEMENT FOR OPERATING RANDOM ACCESS MEMORY IN SYNCHRONISM WITH A DATA PROCESSOR

[75] Inventor: Wilbur C. Vogley, Missouri City, Tex.

[73] Assignee: Texas Instruments Incorporated, Dallas, Tex.

[21] Appl. No.: 487,374

[22] Filed: Jun. 7, 1995

Related U.S. Application Data

[62] Division of Ser. No. 891,483, May 28, 1992, abandoned.

[51] Int. Cl.[6] .............................. G06F 13/00; G06F 1/04
[52] U.S. Cl. ............................................. 395/555; 395/551
[58] Field of Search ............................... 395/550, 421.02, 395/421.07, 421.09

[56] References Cited

U.S. PATENT DOCUMENTS

| | | | |
|---|---|---|---|
| 3,753,232 | 8/1973 | Sporer | 395/425 |
| 3,753,245 | 8/1973 | Philipps et al. | 395/775 |
| 4,415,984 | 11/1983 | Gryger et al. | 395/550 |
| 4,513,372 | 4/1985 | Ziegler et al. | 395/425 |
| 4,648,102 | 3/1987 | Riso et al. | 375/106 |
| 4,712,190 | 12/1987 | Guglielmi et al. | 395/425 |
| 4,817,035 | 3/1989 | Timsit | 395/425 |
| 4,905,201 | 2/1990 | Ohira et al. | 365/230.03 |
| 5,016,224 | 5/1991 | Tanaka et al. | 365/230.03 |
| 5,045,999 | 9/1991 | Danilenko et al. | 395/550 |
| 5,081,575 | 1/1992 | Hiller et al. | 395/325 |
| 5,086,500 | 2/1992 | Greub | 395/550 |
| 5,220,660 | 6/1993 | Yoshizawa et al. | 395/550 |
| 5,255,383 | 10/1993 | Lewis et al. | 395/425 |
| 5,276,649 | 1/1994 | Hoshita et al. | 365/206 |
| 5,293,626 | 3/1994 | Priest et al. | 395/550 |
| 5,303,365 | 4/1994 | Getzlaff et al. | 395/550 |
| 5,390,149 | 2/1995 | Vogley et al. | 365/189.01 |

*Primary Examiner*—Thomas M. Heckler
*Attorney, Agent, or Firm*—Richard B. Havill; Lawrence J. Bassuk; Richard L. Donaldson

[57] ABSTRACT

A data processing system includes a plurality of synchronous random access memory devices, a data processor, and a time skewing circuit interposed between the data processor and the plurality of synchronous memory devices. The time skewing circuit imparts different increments of delay time into memory clock and address signals transmitted to different ones of the synchronous memory devices, imparts different increments of delay time into various control signals, and imparts a uniform increment of delay time into several write enable signals. The read enable signals and the write enable signals are used for loading data into data storage devices, which are a part of the time skewing circuit that is interposed between the data processor and the synchronous memory devices.

1 Claim, 10 Drawing Sheets

| PARAMETER | DESCRIPTION | NUMBER OF REQUIRED CLOCK CYCLES AT | | |
|---|---|---|---|---|
| | | 100MHz | 80MHz | 66MHz |
| tRAS | $\overline{RAS}$ LOW TIME | 6 | 5 | 4 |
| tRAC | DATA OUTPUT LATENCY FROM $\overline{RAS}$ | 6 | 5 | 4 |
| tRCD | $\overline{RAS}$ TO $\overline{CAS}$ DELAY | 2 | 2 | 1 |
| tCDL | DATA IN LATENCY FROM $\overline{CAS}$ AND $\overline{WE}$ | 2 | 2 | 2 |
| tCAS | $\overline{CAS}$ LOW TIME | 1 | 1 | 1 |
| tCP | $\overline{CAS}$ HIGH TIME | 2 | 2 | 1 |
| tPC | $\overline{CAS}$ CYCLE TIME | 3 | 3 | 2 |
| tRSH | $\overline{CAS}$ LOW TO $\overline{RAS}$ HIGH | 4 | 4 | 3 |
| tCAA | ADDRESS ACCESS TIME | 3 | 3 | 2 |
| tWP | $\overline{WE}$ LOW TIME | 1 | 1 | 1 |
| tOED | $\overline{CS}$ TO DATA INPUT | 2 | 2 | 2 |
| tOEA | $\overline{CS}$ LOW TO DATA OUTPUT | 2 | 2 | 1 |
| tRWL | $\overline{WE}$ HIGH TO $\overline{RAS}$ HIGH | 3 | 3 | 2 |
| tWCL | $\overline{WE}$ HIGH TO $\overline{CAS}$ LOW | 3 | 3 | 2 |

SYNCHRONOUS DRAM TIMING PARAMETERS

TIME SKEWING ARRANGEMENT FOR OPERATING RANDOM ACCESS MEMORY IN SYNCHRONISM WITH A DATA PROCESSOR

This is a division of application Ser. No. 07/891,483, filed May 28, 1992, abandoned.

Related patent applications assigned to the assignee of this invention, Texas Instruments:

| Ser. No. | Filing Date | Docket No. |
|---|---|---|
| 690,207 | April 23, 1991 | TI-15876 |
| 783,436 | October 24, 1991 | TI-16309 |

BACKGROUND OF THE INVENTION

This invention relates to a data processing system and more particularly to a data processing system arranged for operating synchronously with a random access memory.

Computer speed is determined by the operating speeds of the data processor, of the memory, of the input/output devices, and of the clock. Individual subsystem operating speeds should be matched with one another to provide the most effective computer operating speed.

During the late 1970's and early 1980's, the microcomputer was in the early stages of development. At that time, a microcomputer system included a microprocessor and a dynamic random access memory. In a microcomputer arrangement, the microprocessor ran synchronously in response to a clock signal, but the dynamic random access memory ran asynchronously with respect to the operation of the microprocessor. The microprocessor clock was applied to a controller circuit that was interposed between the microprocessor and the dynamic random access memory. In response to the microprocessor clock signal, the controller derived other control or clock signals which ran the dynamic random access memory.

As the semiconductor art developed, the operating speeds of microprocessors have become much faster than their associated asynchronous dynamic random access memory. Now microprocessors are capable of completing all of their tasks but then must wait significant periods of time for the dynamic random access memory to complete its tasks.

Recently, designers have proposed arranging computer systems so that both the data processor and the dynamic random access memory operate synchronously in response to a common system clock signal. Operating speeds of such computer systems increase considerably with respect to those using asynchronous random access memory.

Further developments, such as shrinking the dimensions of integrated circuit microprocessors and dynamic random access memories, also have increased computer operating speeds. As a result, data time slots are so short that lead length differences along paths between the microprocessor and different memory arrays are becoming a problem. The different lead lengths cause significantly different time delays for data signals transmitted from the microprocessor to the different memory arrays and from the different memory arrays to the microprocessor.

Because of the very short time slots, the different time delays are substantial with respect to the duration of the time slots. Delay differences of 10%–20% of a time slot may be sufficient to cause errors in signal detection either at the memory arrays or at the microprocessor. A delay difference which exceeds 50% of a time slot places the desired detection time of a data bit outside of its assigned time slot and also causes errors. Such errors create problems which must be resolved for faster data processors to operate effectively.

SUMMARY OF THE INVENTION

These and other problems are solved by a data processing system that includes a plurality of synchronous random access memory devices, a data processor, and a time skewing circuit interposed between the data processor and the plurality of synchronous memory devices. The time skewing circuit imparts different increments of delay time into memory clock and address signals transmitted to different ones of the synchronous memory devices, imparts different increments of delay time into various control signals, and imparts a uniform increment of delay time into several write enable signals. The read enable signals and the write enable signals are used for loading data into data storage devices, which are a part of the time skewing circuit that is interposed between the data processor and the synchronous memory devices.

The time skewing circuit may be fabricated as a device which stores delay data for controlling the number of increments of time delay which are imparted to the memory clock signals and to read enable signals. The time skewing circuit also may include fixed delay circuits for imparting increments of delay to address and control signals. A number of synchronous dynamic random access memory devices together with the time skewing circuit can be mounted on a board as a useful circuit module.

BRIEF DESCRIPTION OF THE DRAWINGS

A fuller understanding of the invention may be derived by reading the following detailed description of an illustrative embodiment they with reference to the attached drawings wherein.

DETAILED DESCRIPTION

Figure 1:
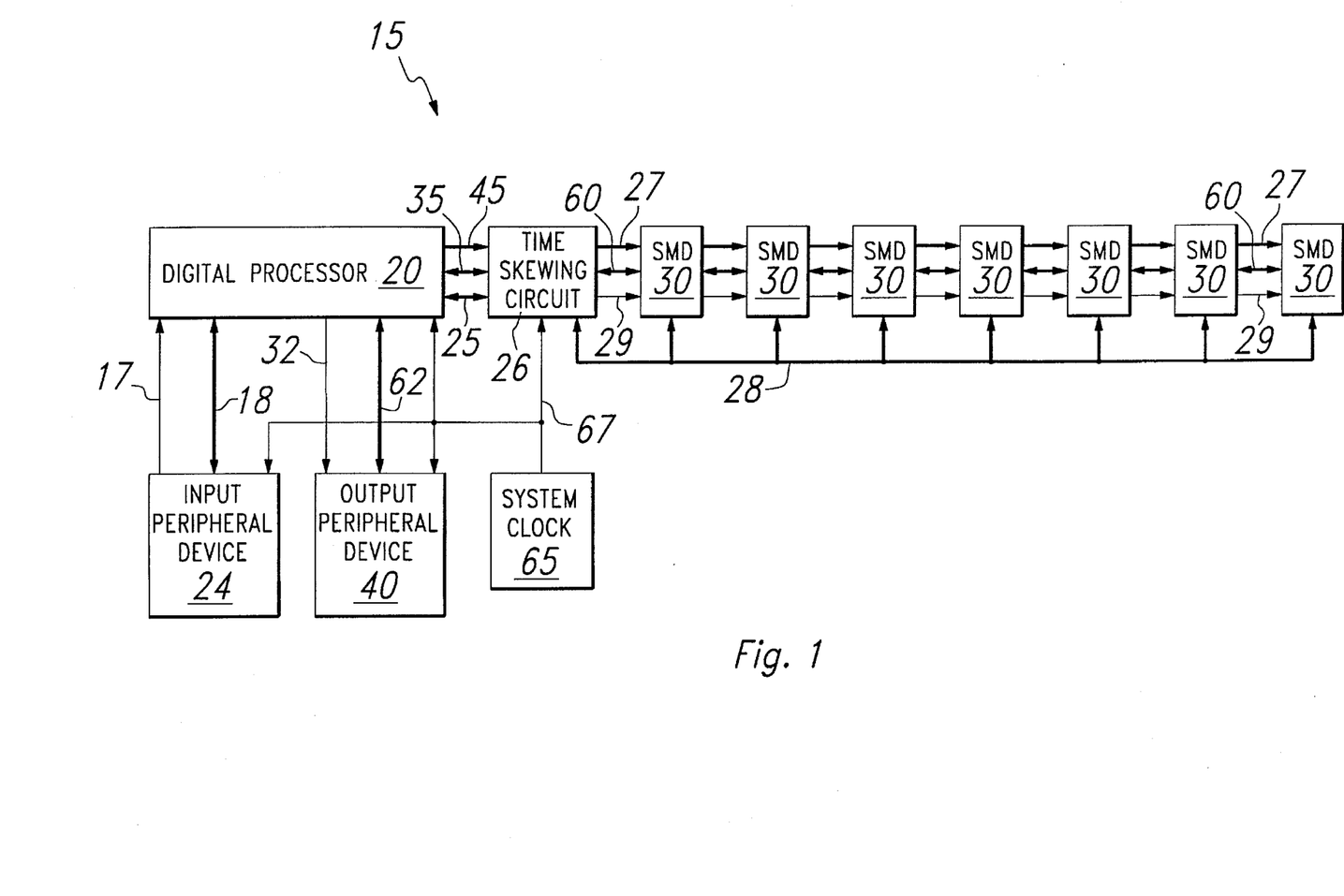
FIG. 1 is a block diagram of a data processing system including a time skewing circuit located between the data processor and a group of synchronous random access memory devices.

Referring now to FIG. 1, a data processing system 15 includes a digital processor 20 which receives digital data by way of an input data bus 17 from an input peripheral device 24. The digital processor 20 may be a microprocessor. Control signals pass between the digital processor 20 and the input peripheral device 24 by way of an input control bus 18. The digital processor 20 processes that data and other data, all of which may be transmitted by way of a processor data bus 25 enroute through a time skewing circuit 26 and a memory data bus 28 to any one of several synchronous memory devices (SMD) 30. Control signals are transmitted between the digital processor 20 and the synchronous memory devices 30 by way of a processor control bus 35, the time skewing circuit 26, and a memory control bus 60. The digital processor 20 also sends resulting output data via an output data bus 32 to an output peripheral device 40 where the output data may be displayed or used for reading, viewing or controlling another device that is not shown. Control signals also are transmitted between the digital processor 20 and the output peripheral device 40 by way of an output control bus 62. System clock signals are produced by a system clock device 65 and are applied through a clock lead 67 to the digital processor 20, the time skewing circuit 26, the input peripheral device 24, and the output peripheral device 40.

From time to time during operation of the data processing system 15, the digital processor 20 accesses the synchronous memory devices 30 for writing data into storage cells thereof or for reading data from the storage cells thereof. Storage cell row and column addresses, generated by the digital processor 20, are applied through a processor address bus 45, the time skewing circuit 26, and a memory address bus 27 to the synchronous memory devices 30. Data may be sent from the digital processor 20 by way of the processor data bus 25, the time skewing circuit 26, and the memory data bus 28 to be written into the synchronous memory devices 30. Data also may be read from the synchronous memory devices 30 through the memory data bus 28, the time skewing circuit 26, and the processor data bus 25 to the digital processor 20.

Control signals, produced by the digital processor 20 and transmitted by way of the processor control bus 35, the time skewing circuit 26, and the memory control bus 60 to the synchronous memory devices 30, include a row address enable signal $\overline{RE0}$, a row address enable signal $\overline{RE1}$, a column address enable signal $\overline{CE}$, a write signal $\overline{WE}$, a data output from memory signal $\overline{DQM}$, a clock enable signal $\overline{CKE}$, and others. Control signals may also be transmitted from the synchronous memory devices 30 through the memory control bus 60, the time skewing circuit 26, and the processor control bus 35 to the digital processor 20. Memory clock signals from the time skewing circuit 26 are transmitted through a memory clock bus 29 to the synchronous memory devices 30.

In one advantageous arrangement, several subsections of the data processing system 15 are mounted and interconnected on a single circuit board as a module. Such a circuit board may be described as a high speed synchronous DRAM module. For example, the module may include the time skewing circuit 26, the memory address bus 27, the memory data bus 28, the memory clock bus 29, the synchronous memory devices 30, and the memory control bus 60. The module has definable performance characteristics which permit it to be tested as a unit. Also it can be inserted, or connected, into the data processing system 15 as a unit. Conversely, it can be disconnected and replaced by a spare module.

Figure 2:
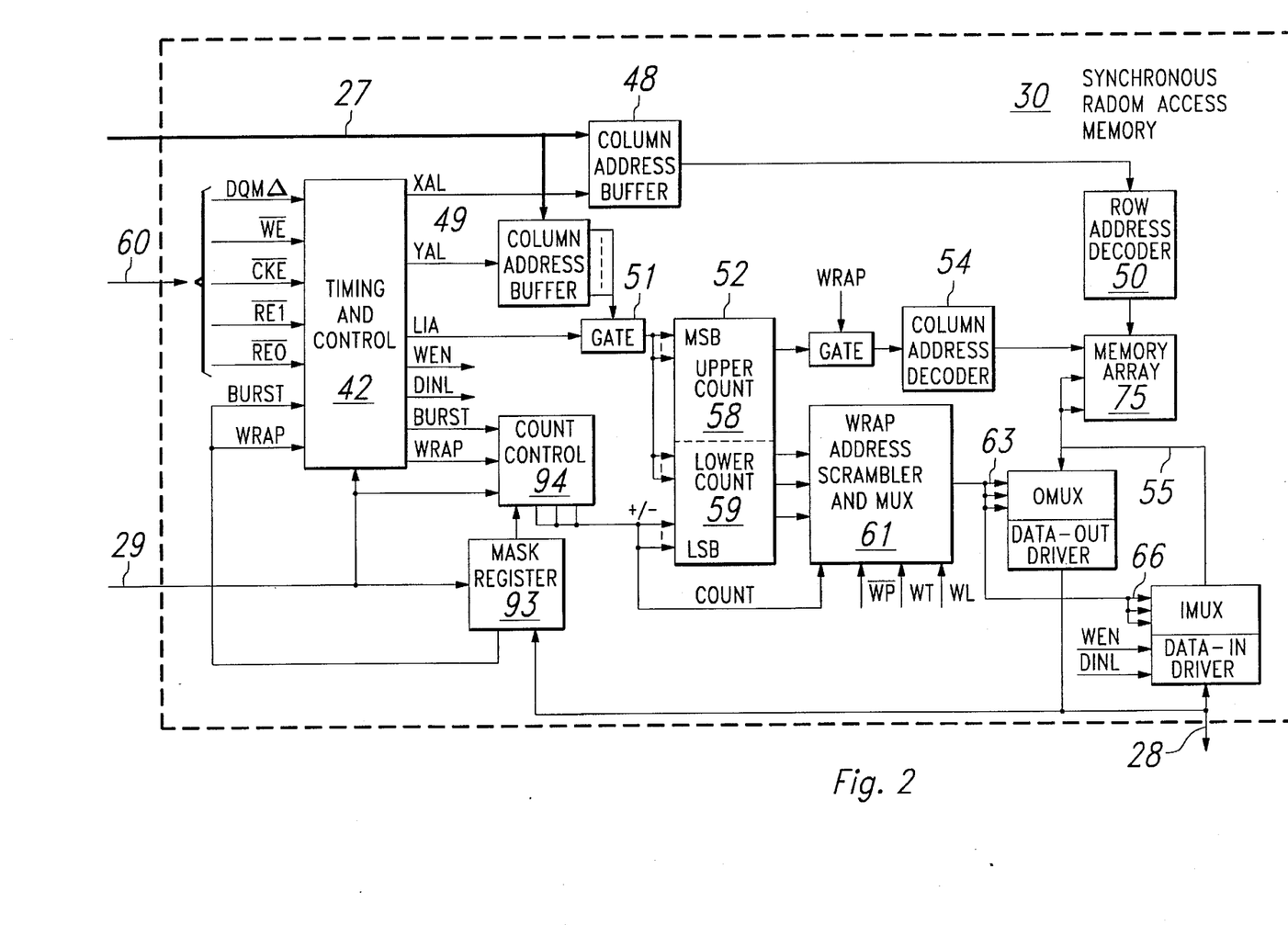
FIG. 2 is a block diagram of a synchronous random access memory.

Referring now to FIG. 2, a single synchronous random access memory device 30 includes a memory array 75 of metal-oxide-semiconductor (MOS) dynamic storage cells arranged in addressable rows and columns. The memory array 75 of storage cells is similar to the well known arrays of cells used in dynamic random access memory devices. Either complementary metal-oxide-semiconductor (CMOS) or bipolar complementary metal-oxide-semiconductor (BICMOS) technology may be used for fabricating the memory array 75.

Several other circuit blocks are shown in FIG. 2. These other circuit blocks are designed and arranged for operating the array of storage cells synchronously with the digital processor 20 of FIG. 1 in response to the memory clock signal on the memory clock bus 29. The circuit blocks other than the array of storage cells may be fabricated as either CMOS or BICMOS circuits.

The synchronous random access memory device 30 is operable for synchronous random access read or write operations, for synchronous burst read or write operations, and for synchronous wrap read or write operations. Operations of synchronous random access memory devices are described in U.S. Pat. No. 5,390,149 issued Feb. 14, 1995 in the names of W. C. Vogley et al and in a U.S. patent application Ser. No. 783,436 filed Oct. 24, 1991, abandoned, which are incorporated herein by reference.

Appropriate time skewing of signals being transmitted through the data processing system 15 can be accomplished by imparting customized time delay into the paths of particular signals being transmitted between the digital processor 20 and the memory devices 30. The amount of time delay for a specific path can be determined by calculation, trial and error, measurement, or any other suitable procedure known to those skilled in the art.

A suitable customized time delay path arrangement may be provided in different ways. One way is to either permanently program the specific time delays by burning-in or fusing a selected path through an array of delay circuits to provide a desired delay in the particular signal path between the digital processor 20 and one of the memory devices 30. Another way is to provide the desired delay by alterably programming such delay into a circuit arrangement which will provide the desired delay in a signal path between the digital processor 20 and one of the memory devices 30. The subsequent description herein will show in detail the arrangement of an alterably programmed circuit arrangement for providing the desired delay in several signal paths between the digital processor 20 and the memory devices 30. The aforementioned, permanently programmed arrangement is considered to be obvious in view of the subsequent description.

Figure 3:
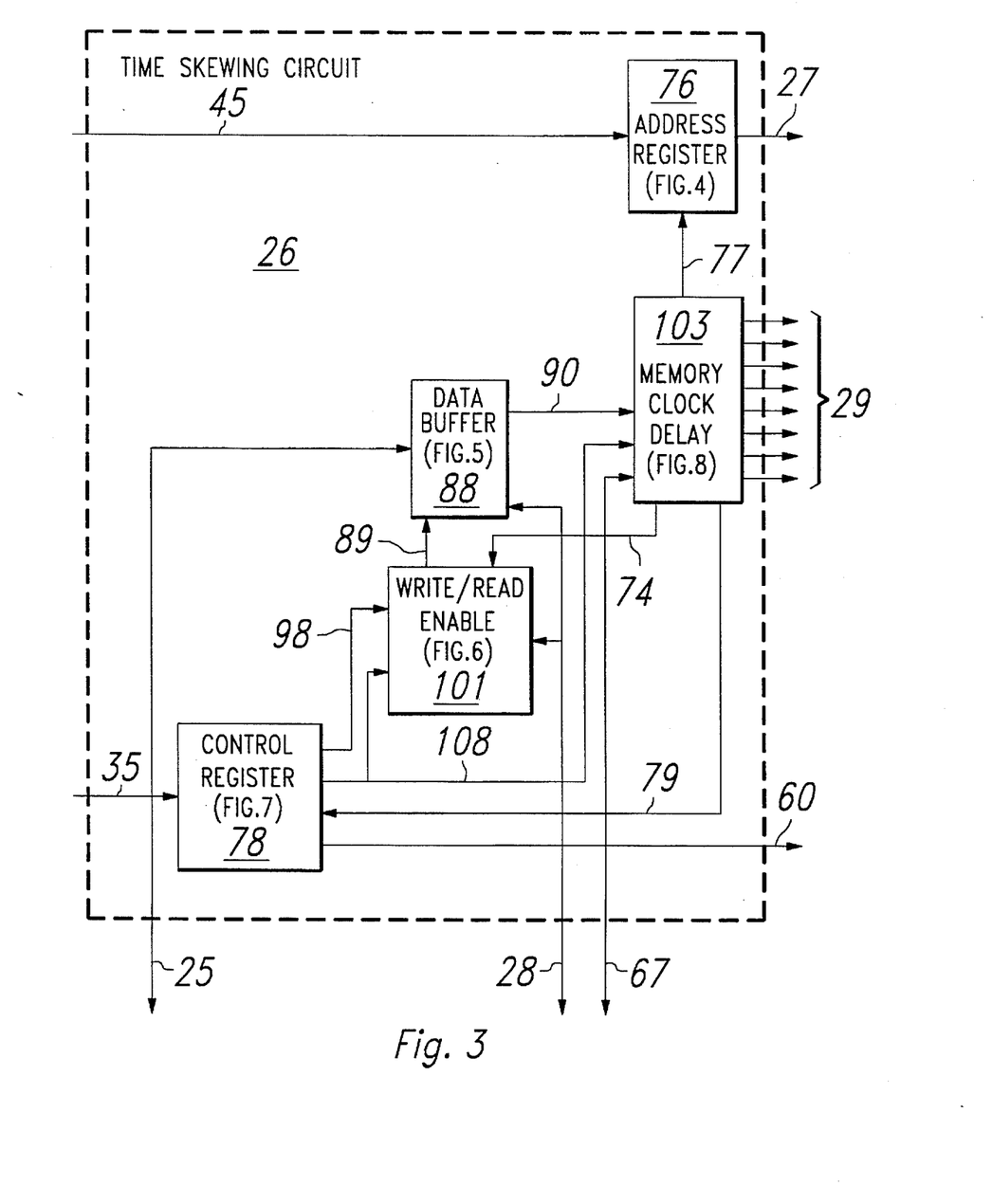
FIG. 3 is a block diagram of the time skewing circuit of FIG. 1.

Referring now to FIG. 3, there is shown a high level block diagram of the time skewing circuit 26 of FIG. 1. There are five major blocks included within the time skewing circuit 26. Those circuit blocks adjust the timing of memory clock signals applied to the memory devices 30 by way of the memory clock bus 29, the timing of write enable and read enable signals which clock data into data buffer storage devices during write and read operations, and the timing of other control signals for the memory.

In the time skewing circuit 26, address signals on the processor address bus 45 are applied to an address register 76. There are several storage devices within the address register 76 for storing the several bits of each applied address. One bit of an address from the processor address bus 45 is stored in each storage device in response to a delayed address register clock signal from a lead 77. The address bits remain stored in the address register 76 for accessing an addressable storage location in the memory devices 30 until the next delayed address register clock signal is applied over the lead 77 to store the next subsequent address to be accessed in the memory devices 30. The arrangement and operation of the address register 76 is to be described in greater detail hereinafter.

Control signals on the processor control bus 35 of FIG. 1 are applied to a control register 78 in the time skewing circuit 26. There are several storage devices within the control register 78 for storing a group of bits representing various control signals. Those bits are stored in the storage devices in response to a control register clock signal from a lead 79. The control bits remain stored in the control register 78 for determining which control signals are applied to other circuit blocks within the time skewing circuit 26 until a subsequent group of bits is stored in the control register 78.

Time skewing circuit 26 also includes a data buffer circuit 88, which receives data from the digital processor 20 of FIG. 1 by way of the processor data bus 25. Output data from the buffer circuit 88 may be transmitted out to the memory devices 30 of FIG. 1 by way of the memory data bus 28, however, when the time skewing circuit 26 is being programmed, data stored in the data buffer circuit 88 represents increments of delay time that are to be forwarded either by way of the memory data bus 28 to a write/read enable circuit 101 or by way of a memory delay data bus 90 to a memory clock delay circuit 103.

Figure 4:
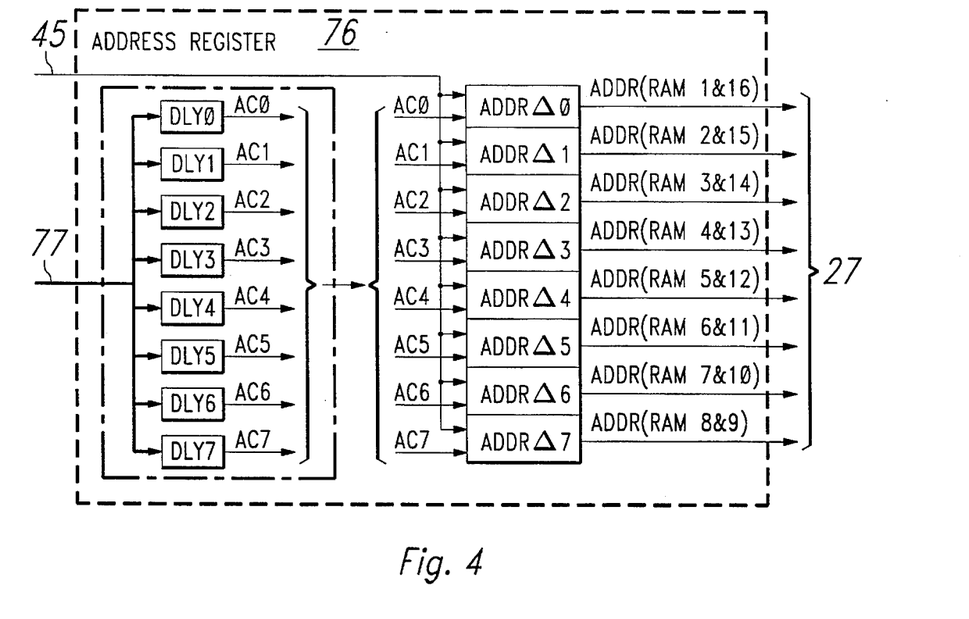
FIG. 4 is a block diagram of an address register used in the time skewing circuit of FIG. 3.

Referring now to FIG. 4, there is shown a diagram of the address register 76, which receives address signals from the processor address bus 45 having a separate lead for each address bit required for addressing the synchronous memory devices 30 of FIG. 1. The address register 76 includes a group of several register circuits ADDRΔ0–ADDRΔ7. Each register circuit, such as register ADDRΔ0, includes enough stages to store the several bits of each address signal. When an address signal is applied to the address register 76, all of the bits are stored in each of the register circuits ADDRΔ0–ADDRΔ7.

Also included in the address register 76 are a group of time delay circuits DLY0–DLY7. The address register clock on the lead 77 from the memory clock delay circuit 103 of FIG. 3 is applied to the input of all of the delay circuits DLY0–DLY7. Each of the delay circuits has a fixed but different increment of time delay which is imparted to the address register clock on the lead 77.

When the address register clock signal on the lead 77 is applied, all of the bits are read out of the register circuits ADDRΔ0–ADDRΔ7. Because the delay circuits impart different increments of delay time to the clock signals applied over address clock leads AC0–AC7, the address signals are transmitted to various memory devices 30 in FIG. 1 at slightly different times. The address signal sent over the longest path to a memory device is delayed least by the delay circuit DLY0. The address signal sent through the shortest path to a memory device is delayed the most by the delay circuit DLY7. The fixed increment of delay, imparted to address signals in each path to the memory, is selected to delay the address signals so they arrive at the relevant synchronous memory device 30 concurrently with the associated data bits sent to the same memory device 30.

Figure 5:
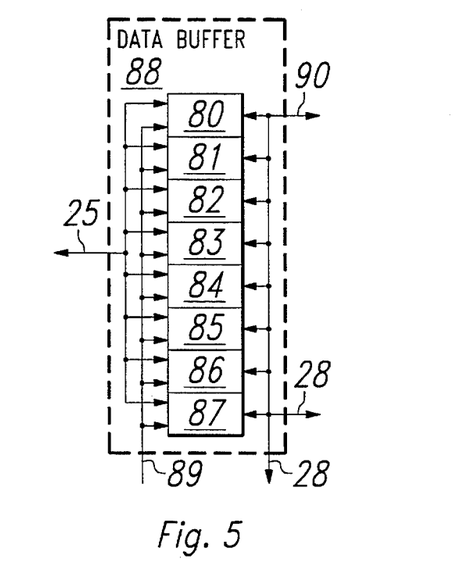
FIG. 5.is a block diagram of an arrangement of a data buffer used in the time skewing circuit of FIG. 3.

Referring now to FIG. 5, there is shown a more detailed diagram of the data buffer circuit 88 having a plurality of data storage devices 80–87 that serve dual purposes. They serve as memory data input/output buffers and also as buffers for the delay data being programmed into the time skewing circuit 26.

In regard to memory data input/output buffers, data transmitted from the digital processor 20 to the time skewing circuit 26 of FIG. 1 are transmitted through the processor data bus 25 to the data storage devices 80–87. The data bits on the processor data bus 25 are stored in the storage devices 80–87 in response to write enable signals applied over a group of control leads 89. The write enable signals on the several control leads 89 are generated so that they concur in time. All of the data bits also arrive at the data storage devices 80–87 from the digital processor at once. Those data bits are stored in response to the write enable signals and remain stored in the storage devices until they are subsequently written to the synchronous memory devices 30 of FIG. 1 by way of the memory data bus 28. Thereafter, new data may be stored in the data storage devices 80–87 in response to a subsequent group of control signals on the control leads 89.

Data read out and transmitted from the synchronous memory devices 30 of FIG. 1 to the time skewing circuit 26 are transmitted through the memory data bus 28 to the data storage devices 80–87. The data bits on the memory data bus 28 are stored in the storage devices 80–87 in response to read enable signals applied over the control leads 89. The read enable signals on the several control leads 89 are generated with different increments of time delay so that they clock into the storage devices 80–87 the data bits which are read from different ones of the synchronous memory devices through different length leads. Since the different length leads from the synchronous memory devices 30 delay the data bits different amounts of time, the different read enable signals are generated to concur with the arrival times of the data bits to each specific storage device. Once the data bits are stored in the storage devices 80–87, they remain there until they are read out to the digital processor 20 of FIG. 1 by way of the processor data bus 25. Thereafter, new data may be stored in the data storage devices 80–87 of FIG. 5 in response to a subsequent group of control signals on the control leads 89.

A second purpose of the data storage devices 80–87 is to receive from the digital processor 20 a group of data bits representing delay data for a specific control signal or clock signal. This delay data is specifically determined with respect to each of the control signals or clock signals so that they concur in arrival time, at the synchronous memory devices 30 or at locations within the time skewing circuit 26, with arrival of data bits after transmission over leads of fixed but different lengths. This delay data is received and stored, in response to a load signal on the lead 89, into the storage devices 80–87 until it is loaded into either a write/read enable circuit 101 of FIG. 6 or a memory clock delay circuit 103 of FIG. 8. Once the delay data is loaded into either of those circuits 101 or 103, it remains stored therein as long as the data processing system 15 is energized or until the memory lead configuration is changed. The delay data determines the delay times imparted to various clock and control signals during all operations of the data processing system 15 of FIG. 1. A description of how the delay times are imparted to the various signals is presented subsequently with respect to FIGS. 6, 7, 8, and 9.

Figure 6:
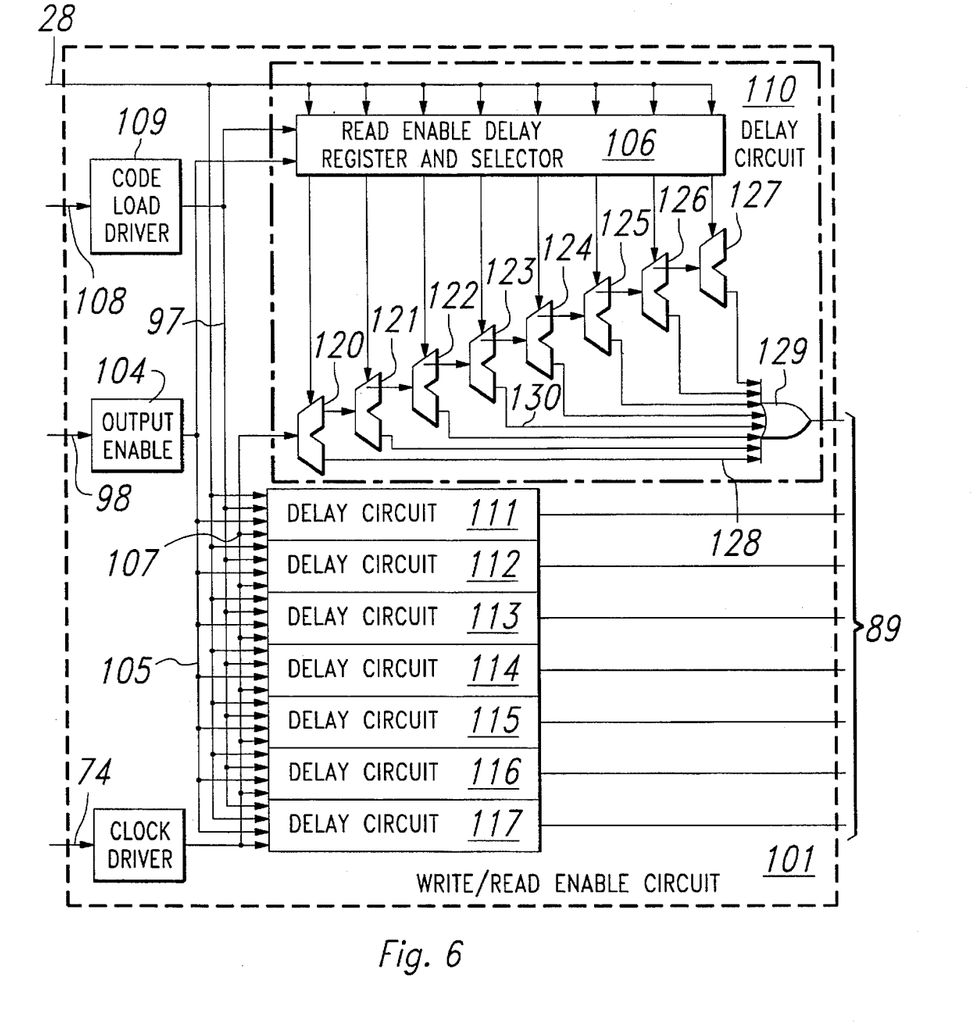
FIG. 6 is a block diagram of a write/read enable circuit used in the time skewing circuit of FIG. 3.

Referring now to FIG. 6, there is shown the write/read enable circuit 101 of FIG. 3. This circuit 101 is arranged to produce a group of write enable or read enable signals on the control signal leads 89 in response to a write signal or a read signal applied on a lead 98 from the digital processor 20 of FIG. 1 and clock signals on the clock lead 76. Delay data, from the memory data bus 28, is stored into a read enable delay register and selector 106, in response to a code load signal on a lead 108, as transmitted through a code load driver 109 and a lead 97 to the read enable delay register and selector 106.

As previously mentioned, all of the write enable signals, on the control signal leads 89, are generated concurrently. The write signal on the lead 98 is a high logic level that causes the output enable driver 104 to apply the write signal over a lead 105 to several delay circuit arrangements 110–117. Each of the delay circuit arrangements 110–117 is the same as the others so only the circuit 110 is shown in detail. The write signal on the lead 105 causes the read enable delay register and selector 106 to output a one-out-of-eight bit code word used for all write operations. This write code word has a single "1" in the left most bit position and all "0s" in the other bit positions. The clock signal on the lead 107 is applied to the signal input of a demultiplexer 120 in a series of demultiplexers 120–127. The input of each demultiplexer is directed to the upper output in response to a control "0" and to the lower output in response to a control "1".

Since a "1" is applied to the left most demultiplexer control terminal, the clock signal is directed to the lead 128 and OR gate 129. The output of the OR gate 129 is a write enable signal on one of the control leads 89. This clock signal traverses the delay circuit arrangement 110 by passing through only a single demultiplexer 120 which imparts a single increment of delay. Because all of the write enable signals are generated the same way, they all have a single increment of delay imparted and therefor occur concurrently.

Read enable signals are generated at different times depending upon the lengths of the specific memory data bus leads 28 between the time skewing circuit 26 and the synchronous memory devices 30 of FIG. 1. Data signal delays are measured and assigned suitable one-out-of-eight bit codes for imparting a desired number of increments of delay into read enable signals so that they arrive at the data storage devices of FIG. 4 concurrently with arriving data bits read from the associated synchronous memory device 30.

When the data processing system 15 of FIG. 1 is being setup, the appropriate read delay code is applied to each read enable delay register and selector, such as register and selector 106 of FIG. 5. This read enable data remains stored therein as long as the data processing system 15 is energized if volatile memory devices are utilized. If non-volatile memory devices are used, then the read enable data remains even after energization is terminated. Every time the read signal, a low logic level, is applied through the output enable circuit 104, the clock signal on lead 107 is delayed according to the number of demultiplexers 120–127 that the clock signal traverses along its path to the OR gate 129. For instance if the single "1" in the read delay code word is stored in the fourth bit position from the left in the register and selector 106, the clock signal traverses four demultiplexers 120, 121, 122 and 123 and a lead 130 to the OR gate 129. The four demultiplexers impart four increments of delay time into the clock signal. The read enable signal generated by this clock signal at the output of the OR gate 129 has four increments of delay time imparted into it. Read enable signals, generated by the delay circuits 111–117, have their selected different increments of delay imparted.

Thus the write/read enable circuit 101 produces both write enable and read enable signals on the group of leads 89. The circuit 101 selects whether a uniform write code word controls the demultiplexers 120–127 of all delay arrangements or different specific read delay code words are applied to the demultiplexers of each delay arrangement 110–117.

Figure 7:
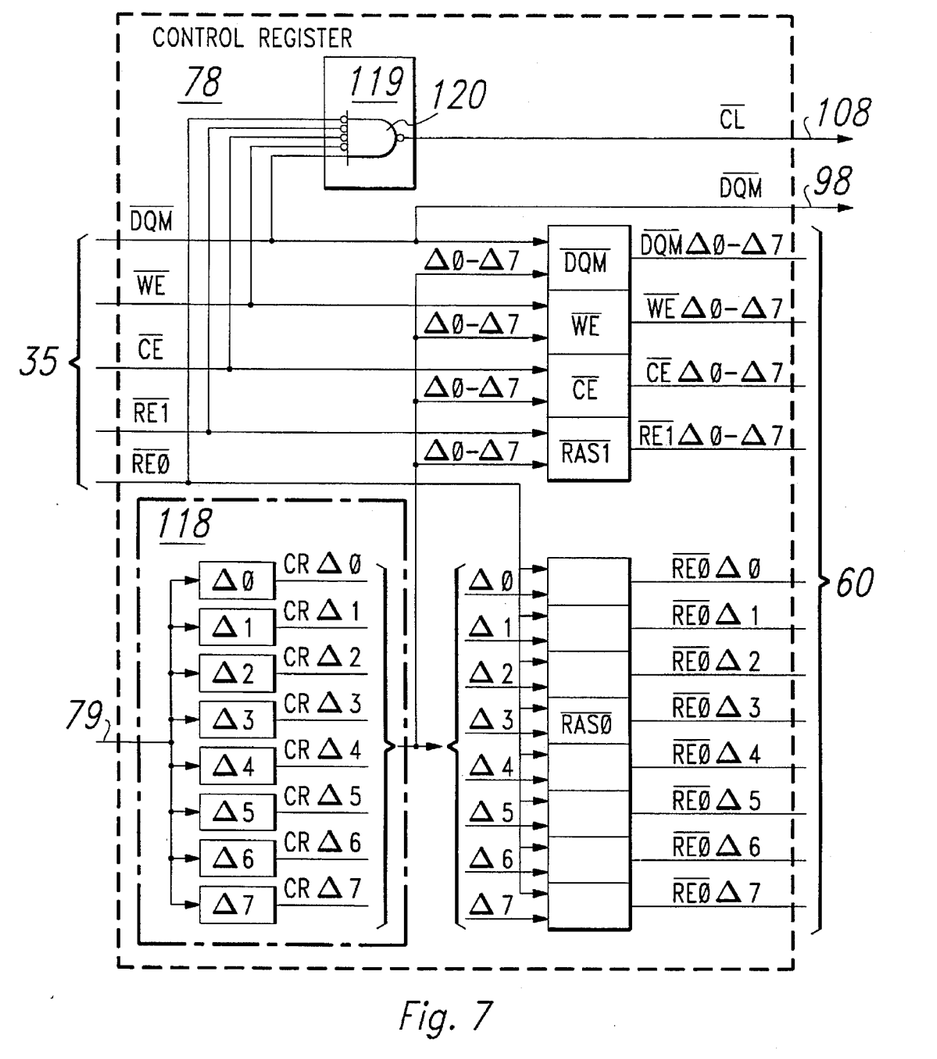
FIG. 7 is a block diagram of a control signal register circuit used in the time skewing circuit of FIG. 3.

Referring now to FIG. 7, there is shown a diagram of the control register 78, which receives control signals from the processor control bus 35 having a separate lead for each of several control signals. The control register 78 includes a group of several register circuits $\overline{RAS0}$, $\overline{RAS1}$, $\overline{CE}$, $\overline{WE}$, and $\overline{DQM}$. Each register circuit, such as register $\overline{RAS0}$, includes enough stages to store several copies of the state of the control signal $\overline{RE0}$ to be stored therein. In FIG. 7, the register circuit $\overline{RAS0}$ is shown in detail, as an example. The other register circuits $\overline{RAS1}$, $\overline{CE}$, $\overline{WE}$, $\overline{DQM}$, shown as blocks, may be arranged similar to the arrangement of the register circuit $\overline{RAS0}$.

Control signals, transmitted from the digital processor 20 of FIG. 1 to the control register 78 of FIG. 7, are transmitted through the processor control bus 35 to the register circuits $\overline{RAS0}$, $\overline{RAS1}$, $\overline{CE}$, $\overline{WE}$, and $\overline{DQM}$. Those control signals, such as the control signal $\overline{RAS0}$, are stored at once in a plurality of stages of the register circuit $\overline{RAS0}$. The control signals remain stored in the stages until they are transmitted to the synchronous memory devices 30 of FIG. 1 by way of the memory control bus 60. Thereafter a new control signal may be applied to the stages of the register circuit $\overline{RAS0}$. Control signal information relating to burst and wrap modes is loaded from the mask register to timing and control circuit 42 and the count control circuit 94 of FIG. 2 at this time.

When it is time to transmit the control signals from the stages of the register circuits $\overline{RAS0}$, $\overline{RAS1}$, $\overline{CE}$, $\overline{WE}$, and $\overline{DQM}$, a control register clock signal on the lead 79, from the memory clock delay circuit of FIG. 3, is applied to a control register delay circuit 118. In the control register delay circuit 118, there are several delay circuits $\Delta 0$–$\Delta 7$, each imparting a different fixed incremental delay time to the control register clock signal. The resulting differently delayed control register clock signals $CR\Delta 0$–$CR\Delta 7$ are applied to the stages of the control register $\overline{RAS0}$ for gating out the stored control signals. The control signals are gated out at appropriate increments of time so that the resulting delayed control signals are transmitted through the memory control bus 60 to arrive concurrently at the various synchronous memory devices 30 of FIG. 1.

Two additional control signals are generated by the control register 78 of FIG. 7. A control load circuit 119 is responsive to the control signals $\overline{RE0}$, $\overline{RE1}$, $\overline{CE}$, $\overline{WE}$, and $\overline{DQM}$ for producing the control load signal $\overline{CL}$. Control load circuit 119 includes an AND gate 120 which produces a logical high level code load signal $\overline{CL}$ on lead 108 when control signals $\overline{RE0}$, $\overline{RE1}$, $\overline{CE}$, and $\overline{WE}$ are low and the control signal $\overline{DQM}$ is high. Thus the code load signal $\overline{CL}$ occurs only when all of the control signals $\overline{RE0}$, $\overline{RE1}$, $\overline{CE}$, and $\overline{WE}$ are low and the output is disabled by the high level of the control signal $\overline{DQM}$. The control signal $\overline{DQM}$ is transmitted through the circuit 119. The two resulting control signals $\overline{CL}$ and $\overline{DQM}$ are applied, respectively, over the leads 108 and 98 to the write/read enable circuit 101 of FIG. 6, as previously described.

Figure 8:
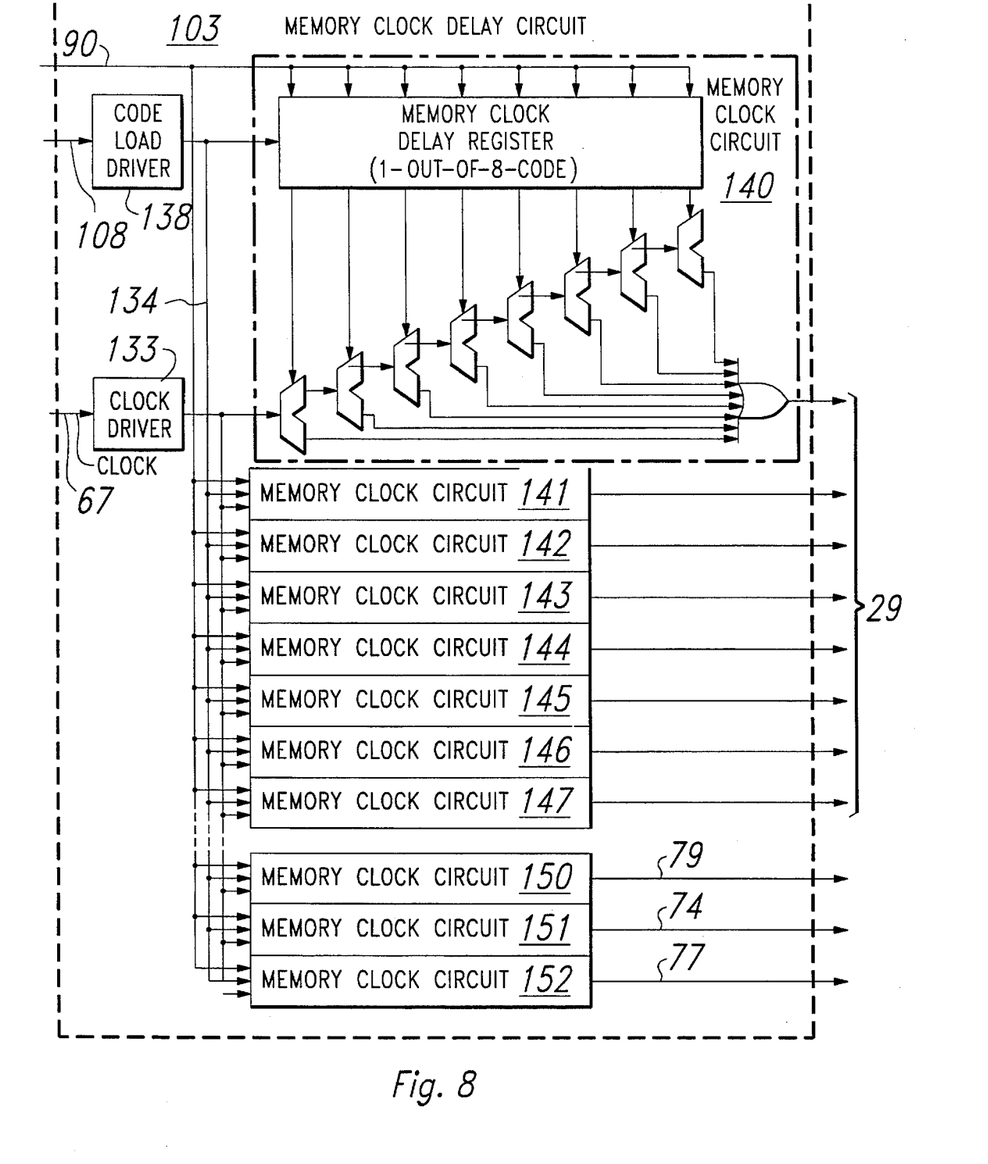
FIG. 8 is a block diagram of a memory clock delay circuit used in the time skewing circuit of FIG. 3.

Referring now to FIG. 8, there is shown the memory clock delay circuit 103 of FIG. 3. This circuit 103 is arranged to produce a group of memory clock signals on the memory clock leads 29 in response to a system clock signal applied on the clock lead 67 to a clock driver 133. Memory clock circuits 140–147 and 150–152, each produces a single memory clock signal for a specific synchronous memory device 30 or for another circuit within the time skewing circuit 26 of FIG. 3. Since the memory clock circuits 140–147 and 150–152 are similar, only the memory clock circuit 140 is shown in detail.

As previously mentioned, the memory clock signals have increments of time delay imparted so that the memory clock signal for a specific synchronous memory device 30 arrives at that memory device concurrently with associated data bits. A measurement of the delay time is converted to a one-out-of-eight bit code word that is applied over leads 90 and is stored into a memory clock delay register 136 in response to a code load signal applied on a lead 108 to a code load driver 138. Either volatile or non-volatile memory devices may be used in the register 136. Once all of the memory clock delay registers are loaded with appropriate delay data from the memory delay data bus 90, in response to the code load signal on a lead 134 from the code load driver 138, that data is stored in volatile memory as long as the data processing system is energized and longer in non-volatile memory.

Memory clock signals are generated on the group of memory clock leads 29 as the processor system clock pulses, applied to the lead 67, traverse the demultiplexers of the delay circuit arrangement. Each memory clock delay code word, in a different memory clock circuit arrangement, may impart a different number of increments of time delay to the memory clock signals it generates than are imparted to other memory clock signals. Each resulting memory clock signal thereby has an appropriate delay time imparted so that it arrives at its associated synchronous memory device 30 concurrently with data bits to be written therein.

Figure 9:
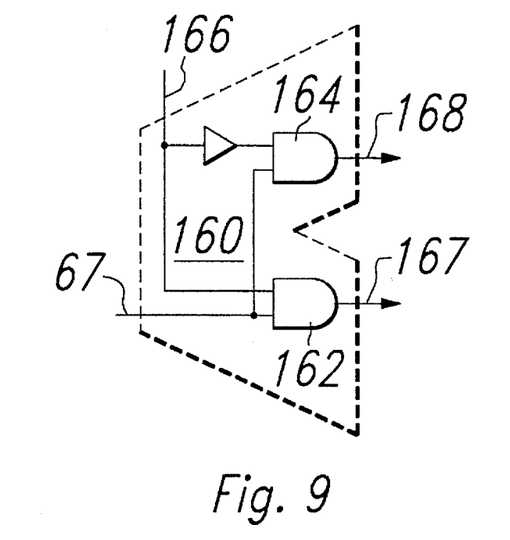
FIG. 9 is a logic schematic diagram of a demultiplexer circuit used in the circuits of FIGS. 6 and 8.

Referring now to FIG. 9, there is shown an exemplary demultiplexer circuit 160. This demultiplexer circuit 160 may be used in the delay circuit arrangements of both FIGS. 6 and 8. In FIG. 9, the processor system clock signal, on the clock lead 67, is applied to an input terminal of each of two AND gates 162 and 164. A control lead 166 from a delay data register (either the read enable delay register 106 or the memory clock delay register 136) carries one of the bits from the delay data register to another input of the AND gate 162. A complement of the bit from the delay data register is applied to the second input of the AND gate 164.

In operation, the system clock signal is directed alternatively to one or the other of the AND gate outputs on leads 167 or 168, depending upon the state of the bit applied on the control lead 166. When a logic "1" is applied, the system clock signal is directed out onto the lead 167. A logic "0", on the control lead 166, directs the system clock signal out on the lead 168.

A finite increment of delay time, or unit of delay time, is used while the system clock signal traverses the demultiplexer 160. Such an increment of delay time is one of the increments of delay time imparted to the clock signals which traverse the delay circuit arrangements of FIGS. 6 and 8. In those illustrative delay circuit arrangements, up to eight increments of delay time may be imparted to the system clock signal, in response to specific delay data stored in the associated delay data register. In actual circuit implementations of the delay circuit arrangements of FIGS. 6 and 8, it is obvious that additional demultiplexers and code bits may be used to provide additional increments of delay time.

The demultiplexer 160 of FIG. 9, the synchronous random access memory devices 30 of FIG. 2, the time skewing circuit 26 of FIG. 3, the data buffer 88 of FIG. 5, the write/read enable circuit 101 of FIG. 6, the control register 78 of FIG. 7, and the memory clock delay circuit 103 of FIG. 8 are presented as exemplary circuit arrangements for illustrating the described embodiment of the invention. In view of the principles disclosed in the presentation of FIGS. 2–9, other arrangements will be obvious to those who are skilled in the art. The foregoing described embodiment of the invention together with those other embodiments made obvious in view thereof are considered to be within the scope of the appended claims.

As previously mentioned, designers have proposed arranging dynamic random access memory to operate synchronously in response to a common system clock signal. The following describes such a memory device.

Figure 10:
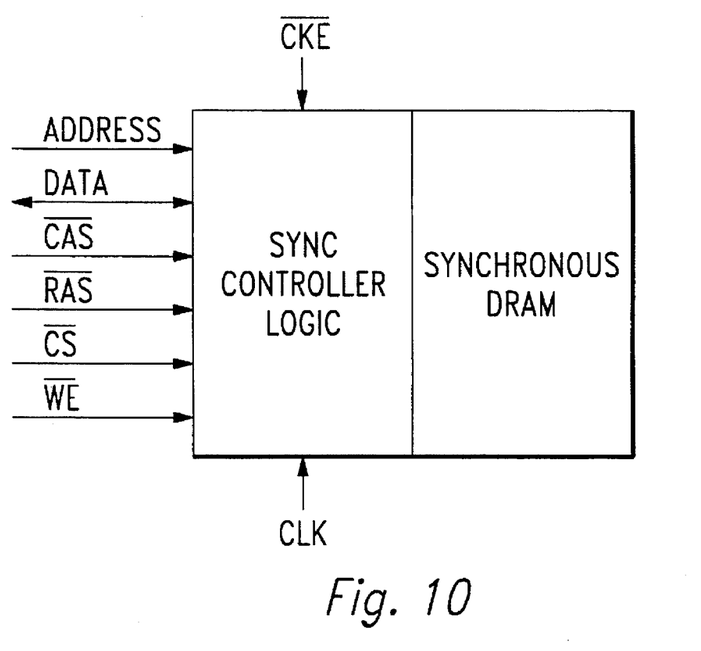
FIG. 10 is a block diagram of a synchronous dynamic random access memory arranged together with synchronous controller logic.

FIG. 10 shows a simplified block diagram of a synchronous DRAM together with synchronous controller logic and signal leads. Functionally the synchronous DRAM is similar to a conventional DRAM in many respects. In particular the storage cells are dynamic memory cells and must be refreshed.

There are aspects of the synchronous DRAM which are quite different from the conventional DRAM. For instance, the synchronous DRAM uses a form of pipelining to speed up throughput and a form of interleaving to eliminate output data gaps. The addition of circuits responsive to a system clock signal CLK and a clock enable signal $\overline{CKE}$ allow the synchronous DRAM to operate in synchronism with the system clock signal. When the clock enable signal $\overline{CKE}$ is high, all inputs to the synchronous DRAM are disabled. When the signal $\overline{CKE}$ is low, the inputs are enabled. The rising edges of clock pulses latch into the synchronous DRAM all address signals and control signals, such as, row address strobe $\overline{RAS}$, column address strobe $\overline{CAS}$, write enable $\overline{WE}$ and chip enable $\overline{CS}$. The rising edges of the clock pulses also latch in data during write operations and latch data onto output leads during read operations.

To improve the memory system performance, several new programmable features have been incorporated. Those features are programmed during a WRITE and $\overline{CAS}$ BEFORE $\overline{RAS}$, WCBR, control signal sequence. The new features include wrap mode, burst mode, a selection of wrap length, wrap with a burst sequence, and the use of data clock latency.

Burst mode enables a sequential data stream to be written to or to be read from the synchronous DRAM starting at a given initial row and column address. Data will continue to be delivered serially into or out of a specified sequence of addresses of the synchronous DRAM at the clock rate, as long as the clock is enabled. After reading out data from the specified addresses, the last address remains in the address register of the synchronous DRAM until the clock is again enabled or another address is loaded. Burst mode is useful for main memory video support because a data stream can be supplied at a 100 MHz rate.

Wrap mode is similar to burst mode for writing in or reading out a sequence of data except that the data is written to or is read from a number of address locations specified by a code word that is loaded into the synchronous DRAM as a result of the WCBR control signal sequence. The addresses are not necessarily in sequential order. Data is delivered at the clock rate as long as the clock is enabled. After reading all of the data from the specified addresses, the address in the address pointer is returned to the initial address. The wrap length may be either four bits, eight bits, or a full row of bits. The number of bits to be accessed also is programmed in response to the WCBR control signal sequence. Wrap mode is very well suited for a cache memory fill or a second level cache memory replacement because data can be supplied at the 100 MHz rate in a sequence needed to back fill the cache memory most efficiently. This operation can eliminate wait states in many systems.

Data clock latency is a result of merging synchronous design techniques with conventional DRAM architecture. Internally the synchronous DRAM uses, for the most part, traditional DRAM circuit design and operational control signals. As a result, the timings for various synchronous DRAM operations are satisfied by a specified number of system clock cycles for any selected system operating frequency.

Figure 11:
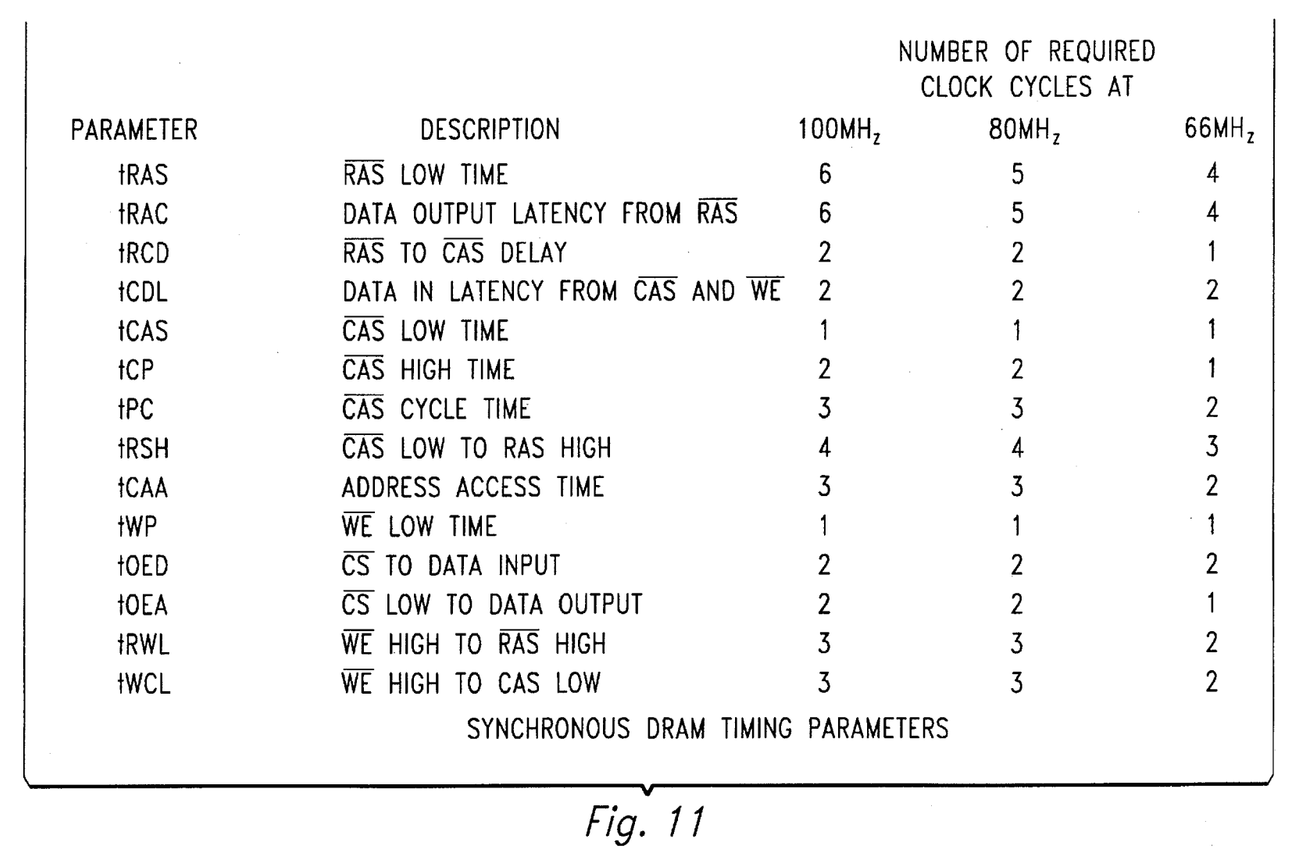
FIG. 11 is a table of synchronous dynamic random access memory timing parameters.

FIG. 11 shows the number of clock cycles required to satisfy several synchronous DRAM timing relationships for predetermined operating frequencies of 66 MHz, 80 MHz and 100 MHz.

Figure 12:
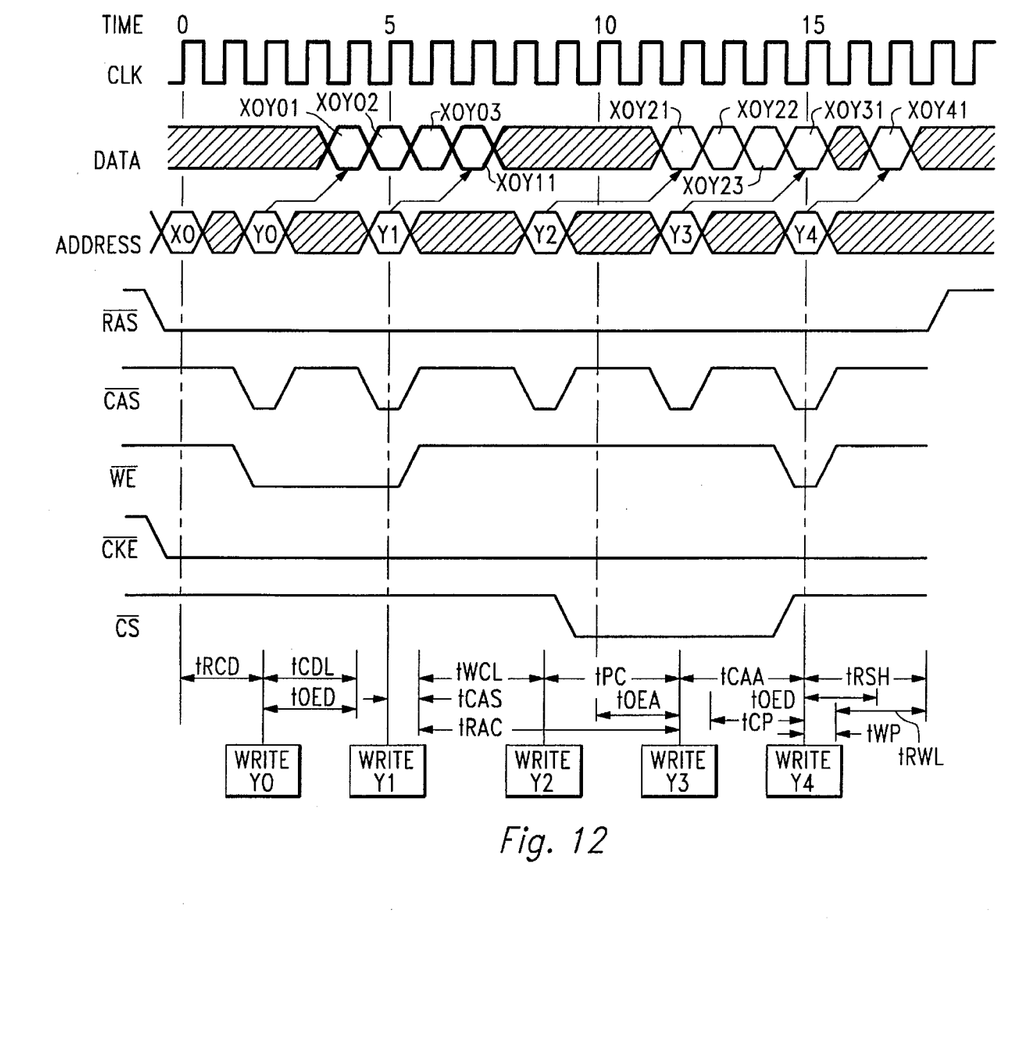
FIG. 12 is a timing diagram for synchronous dynamic random access memory operating in page mode.

FIG. 12 shows an exemplary timing diagram for page mode operation, which is only one of the various synchronous DRAM functions. In FIG. 12, all of the signals are clocked on the rising edge of the 100 MHz system clock signal CLK.

A page mode write operation commences when the initial address, including row address X0 and column address Y0, is clocked into the synchronous Dram at times when the control signals $\overline{RAS}$ and $\overline{CAS}$ are valid low. The first data is written into the selected storage cell after a data in latency period tCDL. This data in latency period starts when the control signals $\overline{CAS}$ and $\overline{WE}$ both are low and has a duration of two clock cycles. The two clock cycle duration for the data in latency period tCDL is shown in both FIGS. 11 and 12.

Data continues to be written at succeeding column addresses with the rising edge of the system clock CLK, as long as write enable signal $\overline{WE}$ and the clock enable signal $\overline{CKE}$ are valid low. A new column address Y1 is clocked into the synchronous DRAM on the fifth clock pulse, and data is written at this new column address after another data in latency period tCDL of two clock cycles. Thus, after an initial address setup latency, data can be written into the synchronous DRAM every 10 nsec. The memory is enabled for data to be written in until two clock cycles after the write enable signal $\overline{WE}$ goes high.

Data can also be read from the synchronous DRAM every 10 nsec after the initial address setup latency. A new column address is clocked into the synchronous DRAM at the ninth clock time. This occurs after a write enable signal $\overline{WE}$ goes high at least three clock cycles before the column address strobe $\overline{CAS}$ goes low. For a read operation, the first data is valid after the column address strobe $\overline{CAS}$ cycle time tPC, i.e., three clock cycles. Once again after an initial address setup latency, data can be read with each clock every 10 nsec.

What is claimed is:

1. An address register comprising:

an address bus;

a plurality of register circuits, each for storing a bit of an address received by way of the address bus;

a lead for applying a clock signal;

a plurality of time delay circuits, having various time delays and responsive to the clock signal, and having a cycle period for producing a group of clock signals occurring at different times within the cycle period; and ones of the group of clock signals being applied to the register circuits for enabling transmission of the address bits from the register circuits at the different times.

* * * * *